United States Patent
Moteki et al.

(10) Patent No.: US 9,310,497 B2
(45) Date of Patent: Apr. 12, 2016

(54) RADIATION MONITOR

(71) Applicant: MITSUBISHI ELECTRIC CORPORATION, Chiyoda-ku (JP)

(72) Inventors: Kenichi Moteki, Chiyoda-ku (JP); Shohei Katayama, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/459,372

(22) Filed: Aug. 14, 2014

(65) Prior Publication Data

US 2015/0355348 A1    Dec. 10, 2015

(30) Foreign Application Priority Data

Jun. 4, 2014    (JP) ................................. 2014-115423

(51) Int. Cl.
  *G01T 7/00*    (2006.01)
  *G01T 7/02*    (2006.01)

(52) U.S. Cl.
  CPC ........................................ *G01T 7/02* (2013.01)

(58) Field of Classification Search
  CPC .......... G21C 17/002; G01T 7/00; G01T 7/04; G01T 7/06; G01T 1/178; G01N 1/2205; G21Y 2002/207
  See application file for complete search history.

(56) References Cited

U.S. PATENT DOCUMENTS

| | | | | |
|---|---|---|---|---|
| 4,219,420 A * | 8/1980 | Muller | .................... | B01D 46/28 210/411 |
| 5,345,479 A * | 9/1994 | Graham | ................ | G21C 17/002 376/250 |
| 5,747,815 A * | 5/1998 | Young | .................. | H01J 49/0018 250/288 |
| 5,952,655 A * | 9/1999 | Gross | ....................... | G01T 1/178 250/255 |
| 6,088,417 A * | 7/2000 | Jax | .......................... | G01M 3/222 376/250 |
| 6,184,531 B1 * | 2/2001 | Smart | ...................... | G01T 1/178 250/253 |
| 7,176,460 B1 * | 2/2007 | Wong | ................. | G01N 21/3504 250/336.1 |
| 2002/0127728 A1 * | 9/2002 | Izaki | ..................... | G01N 1/2252 436/57 |
| 2003/0183769 A1 * | 10/2003 | Ito | ............................ | G01T 1/178 250/364 |

FOREIGN PATENT DOCUMENTS

JP    2011-180061 A    9/2011
WO    WO 2004/040254    *  5/2004

* cited by examiner

*Primary Examiner* — Yara B Green
(74) *Attorney, Agent, or Firm* — Buchanan Ingersoll & Rooney PC

(57) ABSTRACT

A sampling unit that samples a sample gas includes an intake pipe that takes in a sample gas, and a mist/dust elimination unit that eliminates mist produced when steam in a sample gas condenses in the intake pipe and dust, creates a drain including dust, and separates the drain from the sample gas; mist wets fibers loaded therein in a stacked manner so that a water film produced on the surface of the fibers collects dust, and the water film grows to water drops and become drains so that the dust is exhausted and eliminated.

8 Claims, 4 Drawing Sheets

RADIATION MONITOR

BACKGROUND OF THE INVENTION

1. Field of the Invention

The present invention relates to a radiation monitor that extracts a sample gas from an exhaust pipe or the like so as to measure the radioactive concentration of a radioactive substance in sample gas when a severe accident occurs in a nuclear reactor plant or the like.

2. Description of the Related Art

For example, as disclosed in Japanese Patent Application Laid-Open No. 2011-180061 (Patent Document 1), the measurement subject of a conventional radiation monitor is a radioactive noble gas to be exhausted from an exhaust pipe when a loss-of-primary-coolant accident occurs; the conventional radiation monitor covers the scope from the upper limit range of a normal-operation radiation monitor specified in "Guidance for Measurement of Exhausted Radioactive Substance in Power-Generation Light-Water Nuclear Reactor Plant" to the upper limit range of $3.7 \times 10^6$ Bq/cm3 specified in "Examination Guidance for Accidental-Condition Radiation Measurement in Power-Generation Light-Water Nuclear Reactor Plant".

The radiation monitor includes a sampling unit that samples a sample gas, a detection unit that detects a radiation emitted from a radioactive substance in the sampled sample gas and outputs a radiation detection signal, and a measurement unit that measures a radiation, based on the radiation detection signal and remotely controls the sampling unit; the sampling unit is provided with an intake pipe that takes in a sample gas from a sampling point, a filter that collects dust floating in the sample gas, a pump that leads the sample gas, exhausted from the filter, to the detection unit and takes in the sample gas exhausted from the detection unit, an exhaust, pipe that exhausts the sample gas exhausted from the pump, a flow rate sensor that detects the flow rate of a sample gas and outputs a flow rate signal, and a pressure sensor that detects the pressure in the detection unit and outputs a pressure signal; the radiation monitor is designed paying attention mainly to the expansion of the measurement upper limit. That is to say, in order to expand the upper limit of the measurement range, a sample container in the detection unit is downsized so that the detection efficiency is decreased.

A sample gas reaches a high temperature of, for example, maximum 80° C.; however, the sampling unit is configured under the assumption that the sample gas condenses in the intake pipe while being sampled and hence no drain flows into the detection unit.

[Patent Document 1] Japanese Patent Application Laid-Open No 2011-180061

When such a radiation monitor as the conventional radiation monitor in which the detection unit is connected with the sampling unit deals with a severe accident, the accident causes the temperature of the sample gas to further increase and steam to intrude therein; therefore, there has been a problem that during the sampling, the steam condenses to form mist and the filter gets wet due to the mist, thereby obstructing the flow path; in addition, there has been a problem that due to the mist flowing into the detection unit, the surface of the sample container in the detection unit gets wet and particle-like radiation substances are accumulated thereon, thereby causing a measurement obstacle.

Furthermore, there has been a problem that because in order to expand the upper limit of the measurement range, the sample container in the detection unit is downsized so as to decrease the detection efficiency, the pressure of the sample gas becomes unstable when a drain intrudes therein.

SUMMARY OF THE INVENTION

The present invention has been implemented in order to solve the foregoing problems; the objective thereof is to provide a radiation monitor that prevents a drain from intruding in the detection unit and deals with a severe accident.

A radiation monitor according to the present invention includes a sampling unit that samples a sample gas, a detection unit that detects a radiation emitted from a radioactive substance in the sampled sample gas and outputs a radiation detection signal, and a measurement unit that measures radiation, based on the radiation detection signal, and remotely controls the sampling unit; the sampling unit is provided with an intake pipe that takes in a sampled sample gas, a mist/dust elimination unit that eliminates mist produced when steam in a sample gas condenses in the intake pipe and dust floating in a sample gas, creates a drain including dust, and separates the drain from the sample gas, an auto-drain that exhausts a drain discharged from the mist/dust elimination unit to the outside, a temperature sensor that detects the temperature of a sample gas discharged from the mist/dust elimination unit and outputs a temperature signal, a heater that dries the sample gas, the temperature of which has been detected by the temperature sensor, a pump that leads the dried sample gas to the detection unit and takes in the sample gas exhausted from the detection unit, and an exhaust pipe that exhausts the sample gas exhausted from the pump; in the mist/dust elimination unit, mist wets fibers loaded therein in a stacked manner so that a water film produced on the surface the fibers collects dust, and the water film grows to water drops and become drains so that the dust is exhausted and eliminated.

A radiation monitor according to the present invention is configured as described above; therefore, even when due to an accident, steam intrudes in a sample gas and the steam condenses in the intake pipe, thereby producing mist, the mist does not choke the flow path. Furthermore, after being dried, a sample gas is led to the detection unit; therefore, no high-concentration particle-like radioactive substance adheres to and is accumulated in the inside of the detection unit; thus, there can be provided a high-reliability radiation monitor that can stably measure a radiation.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Hereinafter, preferred embodiments of a radiation monitor according to the present invention will be explained with reference to the drawings.

Embodiment 1

Figure 1:
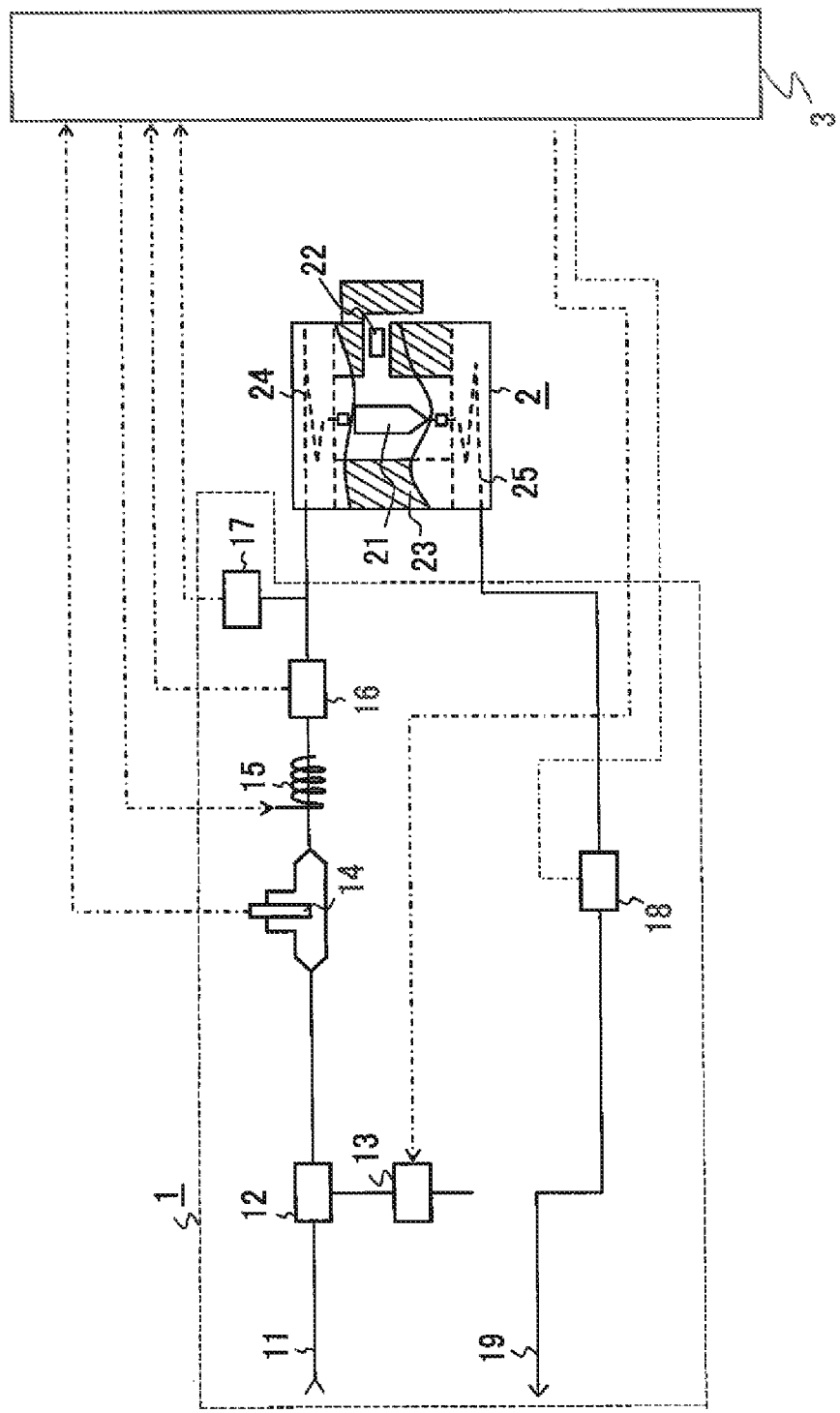
FIG. 1 is a diagram representing the configuration of a radiation monitor according to Embodiment 1 of the present invention.

FIG. 1 is a diagram representing the configuration of a radiation monitor according to Embodiment 1 of the present invention.

In FIG. 1, a radiation monitor according to Embodiment 1 includes a sampling unit 1 that samples a sample gas, a detection unit 2 that detects a radiation emitted from a radioactive substance in the sampled sample gas and outputs a radiation detection signal, and a measurement unit 3 that measures a radiation, based on the radiation detection signal outputted by the detection unit 2 and remotely controls the sampling unit 1.

The sampling unit 1 is provided and configured with an intake pipe 11, a mist/dust elimination unit 12, an auto-drain 13, a temperature sensor 14, a heater 15, a flow rate sensor 16, a pressure sensor 17, a pump 18, and an exhaust pipe 19. In the sampling unit 1 configured as described above, the intake pipe 11 takes in a sample gas from a sampling point such as an exhaust tube (unillustrated). The mist/dust elimination unit eliminates mist produced when steam in the sample gas condenses in the intake pipe 11 and dust floating in the sample gas, and creates a drain that includes dust and is separated from the sample gas; the separated drain is automatically exhausted through the auto-drain 13.

The temperature sensor 14 detects the temperature of the sample gas exhausted from the mist/dust elimination unit 12 and outputs a temperature signal; the heater 15 heats the sample gas, the temperature of which has been detected by the temperature sensor 14, and then dries the sample gas. The flow rate sensor 16 detects the flow rate of the sample gas and outputs a flow rate signal; the pressure sensor 17 detects the pressure of the sample gas and outputs a pressure signal. The pump 18 introduces the sample gas that has been dried by the heater to the detection unit 2 and exhausts the sample gas discharged from the detection unit 2 through the exhaust pipe 19. In general, the destination of the exhausted sample gas is an exhaust tube at the downstream side of the sampling point; however, in some cases, the destination may be an exhaust tube at the upstream side of the sampling point.

The measurement unit 3 receives the temperature signal outputted from the temperature sensor 14 so as to measure the temperature of the sample gas and controls the heater 15 based on the measurement value obtained by adding a temperature, which corresponds to the temperature decrease due to heat radiation before the inlet of the pump 18, to the temperature the sample gas. The temperature which corresponds to the temperature decrease due to heat radiation before the inlet of the pump 18 is preliminarily evaluated.

Next, the detection unit 2 will be explained. The detection unit 2 is provided and configured with a sample container 21, a radiation detector 22, a shield 23, an intake nozzle 24, and an exhaust nozzle 25. In the detection unit 2 configured as described above, while the sample gas passes through the sample container 21, the radiation detector 22 detects a radiation emitted from a radioactive nuclide included in the sample gas and then outputs the radiation detection signal. When the measurement range is wide, the measurement range is divided and two or more radiation detectors 22 may be provided.

The shield 23 surrounds the sample container 21 and the radiation detector 22 so as to shield them from the environmental radiation, so that the hike of the background is suppressed down to the level that does not provide any effect to the radiation measurement any more. The intake nozzle 24 for introducing a sample gas and the exhaust nozzle 25 for exhausting the sample gas are connected with the sample container 21; after being bent in a spiral manner in the shield, the intake nozzle 24 and the exhaust nozzle 25 are connected with the sample container. This method makes it difficult for the environmental radiation to intrude in the inside of the detection unit 2. Therefore, when the flow rate is high, the intake nozzle 24 and the exhaust nozzle 25 may become major constituent elements for the pressure loss.

The temperature of a sample gas may reach 100° C. or higher in a short time when a severe accident occurs, and hence the temperature of the environment where the pump 18 is placed may reach 80° C. or higher; therefore, it is desirable that the temperature of drying by the heater 15 is suppressed to a critical mass, considering reduction of stress on the pump 18. Because no condensation occurs when the temperature of a sample gas is 100° C. or higher, it may be allowed that only when the temperature of the sample gas is lower than 100° C., the heater 15 is operated with a low capacity thereof for the target of, for example, "the measured temperature 10° C.".

Figure 2:
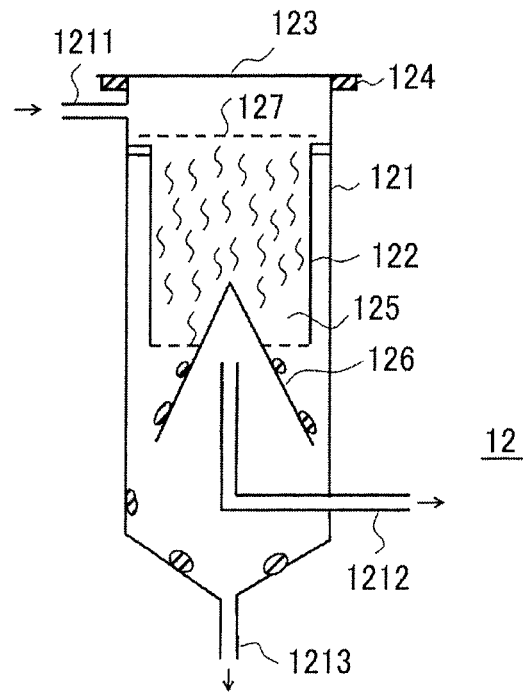
FIG. 2 is a diagram representing the configuration of a mist/dust elimination unit of a radiation monitor according to Embodiment 1 of the present invention.

As illustrated in FIG. 2, in the mist/dust elimination unit 12, an inner container 122 is contained inside a container 121; by removing a cover 123 of the container 121, the inner container 122 can be extracted. The gap between the container 121 and the cover 123 is sealed with a packing 124; an intake nozzle 1211, an exhaust nozzle 1212, and a drain nozzle 1213 are provided in the container 121.

The inside of the inner container 122 is filled with stacked thin-thread-like high-wettability fibers 125; the bottom portion of the stacked fibers 125 is pressed by a conical roof 126 provided below the stacked fibers 125, for example, beneath the stacked fibers 125; the upper portion the stacked fibers 125 is pressed by a wire mesh 127. Mist in a sample gas wets the surface of the fibers 125 and a water film grows to water drops; then, the water drops fall to the bottom of the inner container 122 along the inner surface thereof. Then, the water drops are separated from the sample gas and become drains. The drains separated from the sample gas flow down along the conical roof 126 and then are exhausted through the drain nozzle 1213 provided at the bottom of the container 121. In this situation, dust floating in the sample gas adheres to the water film on the surface of the fibers 125 so as to be efficiently eliminated and then is exhausted along with the drain through the drain nozzle 1213. In contrast, the sample gas from which the mist and the dust are eliminated is blown down along the conical roof 126, and sneaks around to the rear side of the conical roof 126 (the rear side thereof in FIG. 2); then, the sample gas is exhausted through the exhaust nozzle 1212 and is sent to the temperature sensor 14.

The area of a water film produced on the surface of the fibers 125, which are high-wettability materials, is extremely large; therefore, the dust elimination utilizing the water film has an effect that is the same as or larger than the effect of a so-called bubbling cleaning in which sample gas, as fine bubbles, is emitted out of the water so that dust is eliminated. In addition, the dust elimination utilizing the water film does not require a large pressure difference. Accordingly, even when the mesh, as a filter, is rough, effective utilization of the water film makes it possible that the pressure loss is small and the condition continues for a long time; thus, the dust elimination utilizing the water film is suitable for the condition under which the radiation environment is severe and no long-time access is possible. Metal wool can be applied to the fiber 125, which is a high-wettability material. Among metal wool materials, stainless wool is unlikely to rust (dust caused by rust is not produced), easily available, and is inexpensive; thus, stainless wool is suitable.

As described above, in the case of the radiation monitor according to Embodiment 1, in the mist/dust elimination unit 12, a sample gas including mist and dust is made to pass through the layers of the high-wettability fibers 125 so that the fibers get wet so as to eliminate the mist; the water film on the surface of the fibers eliminates the dust; then, drains including the dust are automatically exhausted to the outside through the auto-drain 13. Then, the sample gas exhausted from the mist/dust elimination unit 12 is dried by the heater 15 and is introduced to the detection unit 2; therefore, it is prevented that when the inner surface of the sample container 21 of the detection unit 2 gets wet, particle-like radioactive materials adhere thereto and are piled up thereon and hence the background in the radiation measurement fluctuates. Therefore, there is demonstrated an effect that the radiation measurement can stably be implemented and that because long-time maintenance is not required, contribution to the reduction of radiation exposure can be expected.

Embodiment 2

Figure 3:
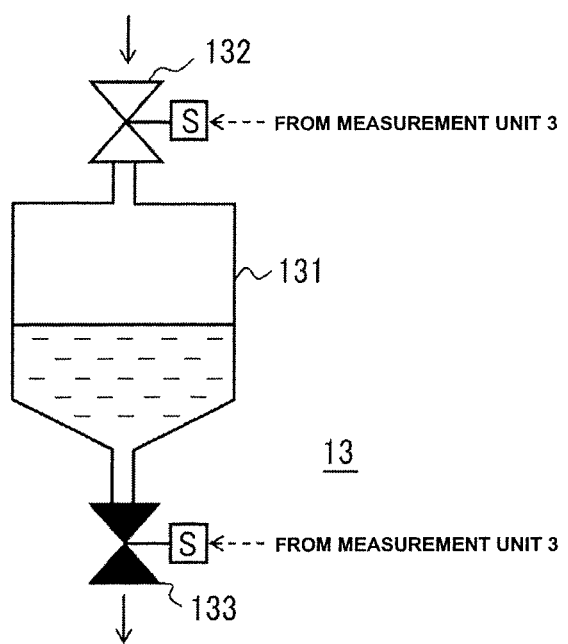
FIG. 3 is a diagram representing the configuration of an auto-drain of a radiation monitor according to Embodiment 2 of the present invention.

Next, a radiation monitor according to Embodiment 2 of the present invention will be explained. FIG. 3 is a diagram representing the configuration of an auto-drain of a radiation monitor according to Embodiment 2.

In FIG. 3, an auto-drain 13 of a radiation monitor according to Embodiment 2 is provided with a drain pot 131 that accumulates drains, an inlet electromagnetic valve 132 that is provided at the inlet of the drain pot 131 and performs opening/closing control of the inflow drain, based on a signal from the measurement unit 3, and an outlet electromagnetic valve 133 that is provided at the outlet of the drain pot 131 and performs opening/closing control of the exhaust of drains, based on a signal from the measurement unit 3. Other configurations of the radiation monitor are the same as those in Embodiment 1; thus, drawing therefor in FIG. 3 and explanations therefor will be omitted.

In the radiation monitor according to Embodiment 2 configured as described above, the inlet electromagnetic valve 132 operates in such a way that it is opened when not energized and it is closed when energized; the outlet electromagnetic valve 133 operates in such a way that it is closed when not energized and it is opened when energized. The measurement unit 3 periodically controls the inlet electromagnetic valve 132 and the outlet electromagnetic valve 133 in such a way that drains are exhausted only after a set elapse time and only for a set time so that both the inlet electromagnetic valve 132 and the outlet electromagnetic valve 133 are not energized during normal operation and are energized during exhaust of drains.

The temperature of the environment where the drain pot 131 is placed may reach 80° C. or higher when a severe accident occurs; however, when drains are exhausted, for example, once per hour and the energization times for the inlet electromagnetic valve 132 and the outlet electromagnetic valve 133 are limited to 30 seconds or shorter so that self-heating is suppressed, an ordinary electromagnetic valve employing a class H coil can be utilized and hence an inexpensive and high-reliability radiation monitor can be provided.

Because at each of the inlet electromagnetic valve 132 and the outlet electromagnetic valve 133, drains and inner air (sample gas) alternately travel, it is required to select valves having a sufficient diameter for the alternation. Alternatively, it may be allowed that instead of two-way electromagnetic valves illustrated in FIG. 3, three-way electromagnetic valves having an outer air opening are utilized.

Embodiment 3

Figure 4:
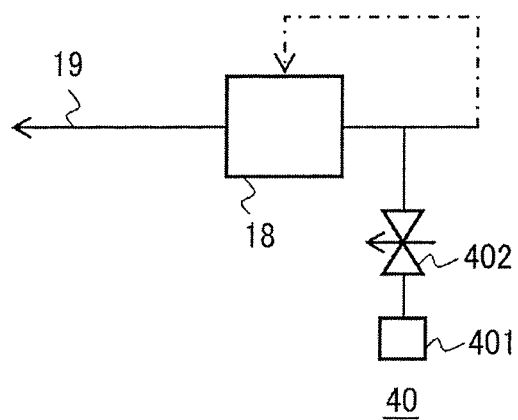
FIG. 4 is a diagram representing the configuration of an outer air introduction unit of a radiation monitor according to Embodiment 3 of the present invention.

Next, a radiation monitor according to Embodiment 3 of the present invention will be explained. FIG. 4 is a diagram representing the configuration of an outer air introduction unit of a radiation monitor according to Embodiment 3.

As illustrated in FIG. 4, the radiation monitor according to Embodiment 3 is provided with an outer air introduction unit 40 at the inlet of the pump 18. The outer air introduction unit 40 is provided and configured with a filter 401 for eliminating dust that is included in the outer air introduced in order to protect the pump 18 and that may hinder the operation of the pump 18 and a flow rate adjustment valve 402 for adjusting the flow rate of the outer air to be introduced. Other configurations of the radiation monitor are the same as those in Embodiment 1; thus, drawing therefor in FIG. 4 and explanations therefor will be omitted.

In the radiation monitor according to Embodiment 3, as the result of a severe-accident evaluation, the ratio of outer air to be introduced to a sample gas is determined, based on the upper limit temperature at the sampling point for a sample gas, the upper limit temperature at the inlet of the mist/dust elimination unit 12, and the environmental upper limit temperature of the pump 18 so that the flow rate of the outer air to be introduced is determined; then, based on a signal from a tentatively provided flowmeter, the opening degree of the flow rate adjustment valve 402 is adjusted and fixed. The outer air is introduced and mixed with the sample gas in order to lower the temperature, so that the temperature stress on the pump 18 can be reduced, and the pressure loss in the detection unit 2 is decreased, so that the load on the pump can be reduced; therefore, a high-reliability radiation monitor can be provided. There has been explained a case where in the outer air introduction unit 40, a flowmeter is tentatively provided when the opening degree of the flow rate adjustment valve 402 is set; however, the flowmeter may be constantly provided.

Embodiment 4

Figure 5:
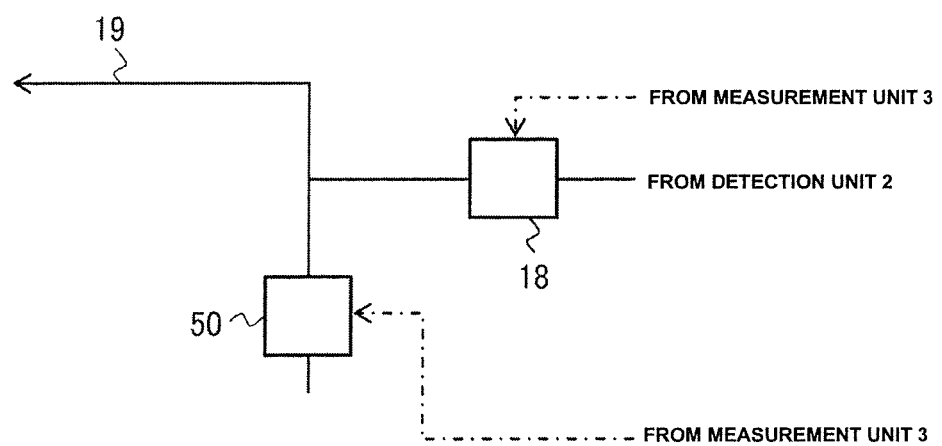
FIG. 5 is a diagram representing the system arrangement of an auto-drain, at the downstream side of a pump, of a radiation monitor according to Embodiment 4 of the present invention.

Next, a radiation monitor according to Embodiment 4 of the present invention will be explained. FIG. 5 is a diagram representing the system arrangement of an auto-drain, at the downstream side of a pump, of a radiation monitor according to Embodiment 4.

As illustrated in FIG. 5, in the section from the outlet of the pump 18 to the rising point of the exhaust pipe 19, the radiation monitor according to Embodiment 4 is provided with a second auto-drain 50 having a structure and a function that are the same as those of the auto-drain 13. Other configurations of the radiation monitor are the same as those in Embodiment 1; thus, drawing therefor in FIG. 5 and explanations therefor will be omitted.

Because the radiation monitor according to Embodiment 4 is provided with the second auto-drain 50, even when the gradient of the exhaust pipe 19 is the rising one and new condensation occurs in the exhaust pipe 19, thereby producing drains, the drains flowing against the flow of a sample gas being exhausted can automatically be discharged by the second auto-drain 50. Therefore, a high-reliability radiation monitor can be obtained.

Embodiment 5

Figure 6:
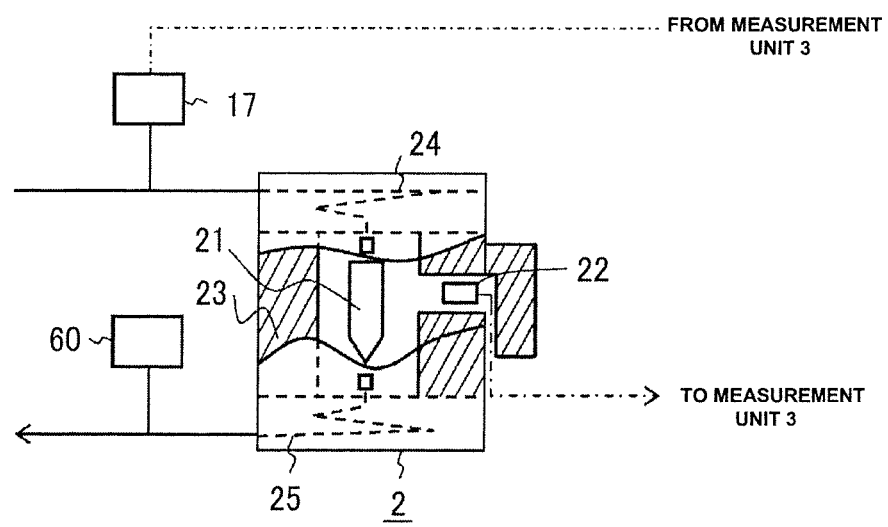
FIG. 6 is a diagram representing the configuration and the system of a pressure sensor of a radiation monitor according to Embodiment 5 of the present invention.

Next, a radiation monitor according to Embodiment 5 of the present invention will be explained. FIG. 6 is a diagram representing the configuration and the system of a pressure sensor of a radiation monitor according to Embodiment 5.

As illustrated in FIG. 6, the radiation monitor according to Embodiment 5 is provided and configured with the pressure sensor 17 at the inlet of the detection unit 2 and a second pressure sensor 60 having a function that is the same as that of the pressure sensor 17 at the outlet of the detection unit 2. In the radiation monitor according to Embodiment 5, the flow rate sensor 16 in the radiation monitor according to Embodiment 1 is omitted; however, other configurations are the same as those in Embodiment 1; thus, drawing therefor in FIG. 6 and explanations therefor will be omitted.

In the radiation monitor according to Embodiment 5, the respective pressure signals from the pressure sensor 17 and the second pressure sensor 60 are inputted to the measurement unit 3, and the respective pressures are measured; based on the average value of the respective pressures of the pressure sensor 17 and the second pressure sensor 60 and the difference between the respective pressures, the flow rate is obtained and outputted. Accordingly, when a pressure correction is applied to the radiation dose by use of the average pressure, a high-accuracy correction can be implemented; thus, the flow rate sensor 16 in the radiation monitor according to Embodiment 1 can be removed. Moreover, because when there exist drains in the pipe, a large pulsation occurs in the flow of a sample gas, the measurement of the flow rate sensor 16 becomes unstable, in general; however, because when the flow rate is obtained based on the pressure difference, the pulsation is cancelled and the flow rate sensor 16 stably operates, a high-reliability radiation monitor can be provided.

Heretofore, the respective radiation monitors according to Embodiments 1 through 5 of the present invention have been explained; however, in the scope of the present invention, the embodiments thereof can freely be combined with one another and can appropriately be modified or omitted.

What is claimed is:

1. A radiation monitor comprising:
   a sampling unit that samples a sample gas;
   a detection unit that detects a radiation emitted from a radioactive substance in a sampled sample gas and outputs a radiation detection signal; and
   a measurement unit that measures a radiation, based on the radiation detection signal, and remotely controls the sampling unit,
   wherein the sampling unit includes an intake pipe that takes in a sampled sample gas, a mist/dust elimination unit that eliminates mist produced when steam in a sample gas condenses in the intake pipe and dust floating in a sample gas, creates a drain including dust, and separates the drain from the sample gas, an auto-drain that exhausts a drain discharged from the mist/dust elimination unit to the outside, a temperature sensor that detects the temperature of a sample gas discharged from the mist/dust elimination unit and outputs a temperature signal, a heater that dries the sample gas, the temperature of which has been detected by the temperature sensor, a pump that leads the dried sample gas to the detection unit and takes in the sample gas exhausted from the detection unit, and an exhaust pipe that exhausts the sample gas discharged from the pump, and
   wherein in the mist/dust elimination unit, mist wets fibers loaded therein in a stacked manner so that a water film produced on the surface of the fibers collects dust, and the water film grows to water drops and become drains so that the dust is exhausted and eliminated.

2. The radiation monitor according to claim 1,
   wherein the mist/dust elimination unit is provided with a conical roof beneath the fibers loaded therein in a stacked manner so that a sample gas including water drops is blew down toward the conical roof, and
   wherein the mist/dust elimination unit is further provided with an air outlet that takes in the blew-down sample gas from the space under the conical roof and then exhausts the sample gas and a water outlet that exhausts drains fallen from the conical roof.

3. The radiation monitor according to claim 1, wherein the fibers are formed of stainless wool.

4. The radiation monitor according to claim 1, wherein the measurement unit receives the temperature signal from the temperature sensor so as to measure the temperature of a sample gas and controls the heater by utilizing, as an upper limit, a setting value obtained by adding a preliminarily evaluated temperature that corresponds to a temperature decrease due to heat radiation before the inlet of the pump, to the temperature of the sample gas.

5. The radiation monitor according to claim 1,
   wherein the auto-drain is provided an inlet electromagnetic valve that operates in such a way as to be opened when not energized and as to be closed when energized, and an outlet electromagnetic valve that operates in such a way as to be closed when not energized and as to be opened when energized, and
   wherein the measurement unit controls the inlet electromagnetic valve and the outlet electromagnetic valve in such a way that drains including dust are exhausted only after a set elapse time and only for a set time so that both the inlet electromagnetic valve and the outlet electromagnetic valve are not energized during sampling operation and are energized during exhaust of drains.

6. The radiation monitor according to claim 1, wherein an outer air introduction unit is provided at the inlet of the pump and outer air is mixed with a sample gas exhausted from the detection unit so that the temperature of the sample gas is lowered.

7. The radiation monitor according to claim 1, wherein a second auto-drain is provided between the rising point of the exhaust pipe and the outlet of the pump.

8. The radiation monitor according to claim 1,
   wherein a pressure sensor for detecting the pressure of a sample gas is provided at each of the inlet and the outlet of the detection unit, and
   wherein the measurement unit measures, as the pressure of the detection unit, the average value of the respective pressures outputted from the pressure sensors and measures a flaw rate, based on the difference between the respective pressures outputted from the pressure sensors.

* * * * *